US006869056B2

(12) United States Patent
Tsukuda (10) Patent No.: US 6,869,056 B2
(45) Date of Patent: Mar. 22, 2005

(54) TILT-SWIVEL STAND (75) Inventor: Masanori Tsukuda, Hyogo (JP)

(73) Assignee: Fujitsu Limited, Kawasaki (JP)

( * ) Notice: Subject to any disclaimer, the term of this patent is extended or adjusted under 35 U.S.C. 154(b) by 4 days.

(21) Appl. No.: 10/661,555

(22) Filed: Sep. 15, 2003

(65) Prior Publication Data
US 2004/0051012 A1 Mar. 18, 2004

Related U.S. Application Data (62) Division of application No. 09/645,527, filed on Aug. 25, 2000, now Pat. No. 6,644,616.

(30) Foreign Application Priority Data

Dec. 14, 1999 (JP) .......................................... 11-354221

(51) Int. Cl.[7] .............................................. A47G 29/00
(52) U.S. Cl. .................... 248/371; 248/349.1; 248/923; 248/183.2
(58) Field of Search ............................ 243/371, 349.1, 243/183.2, 396, 398, 395, 181.1, 919–923; 403/315–313.15, 326, 329, 330

(56) References Cited

U.S. PATENT DOCUMENTS

| | | | |
|---|---|---|---|
| 3,486,629 A | 12/1969 | Slaga | 211/1.5 |
| 4,068,961 A | 1/1978 | Ebner et al. | 403/55 |
| 4,345,849 A | 8/1982 | Stenemann | 403/252 |
| 4,360,286 A | 11/1982 | Beer | 403/201 |
| 4,453,687 A | 6/1984 | Sweere | 248/183 |
| 4,483,503 A | 11/1984 | Gahan | 248/349 |
| 4,522,008 A | 6/1985 | Zeigler | 52/646 |
| 4,554,590 A | 11/1985 | Chelin et al. | 358/248 |
| 4,562,988 A | 1/1986 | Bumgardner | 248/181.1 |
| 4,564,166 A | 1/1986 | Craft et al. | 248/349 |
| 4,579,473 A | 4/1986 | Brugger | 403/163 |
| 4,589,713 A | 5/1986 | Pfuhl et al. | 339/7 |
| 4,591,120 A | 5/1986 | Bryant-Jeffries et al. | 248/179 |
| 4,621,782 A | 11/1986 | Carlson et al. | 248/183 |
| 4,852,830 A | 8/1989 | Howard et al. | 248/183 |
| 4,880,191 A | 11/1989 | Lake, Jr. | 248/371 |
| 4,989,813 A * | 2/1991 | Kim et al. | 248/184.1 |
| 5,024,415 A | 6/1991 | Purens | 248/349.1 |
| 5,037,050 A | 8/1991 | Lin et al. | 248/179 |
| 5,102,082 A | 4/1992 | Bang | 248/183 |
| 5,209,446 A | 5/1993 | Kawai | 248/349 |
| 5,398,903 A | 3/1995 | Cho | 248/349 |
| 5,553,820 A | 9/1996 | Karten et al. | 248/286.1 |
| 5,564,669 A * | 10/1996 | Wu | 248/346.01 |
| 5,569,895 A | 10/1996 | Lynch et al. | 235/1 R |
| 5,588,625 A | 12/1996 | Beak | 248/371 |
| 5,603,478 A | 2/1997 | Wang | 248/371 |
| 5,632,463 A | 5/1997 | Sung et al. | 248/371 |
| 5,709,360 A | 1/1998 | Rosen | 248/278.1 |
| 5,881,985 A | 3/1999 | Hoenig | 248/371 |
| 5,881,989 A | 3/1999 | O'Brien et al. | 248/634 |
| 6,024,336 A | 2/2000 | Lin et al. | 248/371 |
| 6,047,939 A | 4/2000 | Kim | 248/371 |
| 6,089,520 A | 7/2000 | Wu et al. | 248/371 |
| 6,116,560 A | 9/2000 | Kim | 248/371 |
| 6,135,411 A | 10/2000 | Shirasawa | 248/349.1 |
| 6,196,756 B1 | 3/2001 | Leverger | 403/326 |
| 6,644,616 B1 * | 11/2003 | Tsukuda | 248/371 |

FOREIGN PATENT DOCUMENTS

| | | |
|---|---|---|
| JP | 06-189229 | 7/1994 |
| JP | 08-140017 | 5/1996 |

\* cited by examiner

Primary Examiner—Anita King
Assistant Examiner—Amy J. Sterling
(74) Attorney, Agent, or Firm—Westerman, Hattori, Daniels & Adrian, LLP (57) ABSTRACT

A tilt-swivel stand includes a base member, a movable member mounted on the base member, and a connecting mechanism for connecting the base member to the movable member. The connecting mechanism consists of a protrusion and a guide groove into which the protrusion is inserted. The protrusion includes a shank and an engaging portion. This engaging portion has a normal size greater than the width of the guide groove. The engaging portion is flexible enough to go through the guide groove.

8 Claims, 10 Drawing Sheets

TILT-SWIVEL STAND

This application is a division of prior application Ser. No. 09/645,527 filed Aug. 25, 2000 and issued as U.S. Pat. No. 6,644,616.

BACKGROUND OF THE INVENTION

1. Field of the Invention

The present invention relates to a tilt-swivel stand. In particular, it relates to a tilt-swivel stand to support e.g. a CRT (cathode ray tube) for moving the screen of the CRT both in a vertical plane (tilt) and in a horizontal plane (swivel).

2. Description of the Related Art

Figure 10:
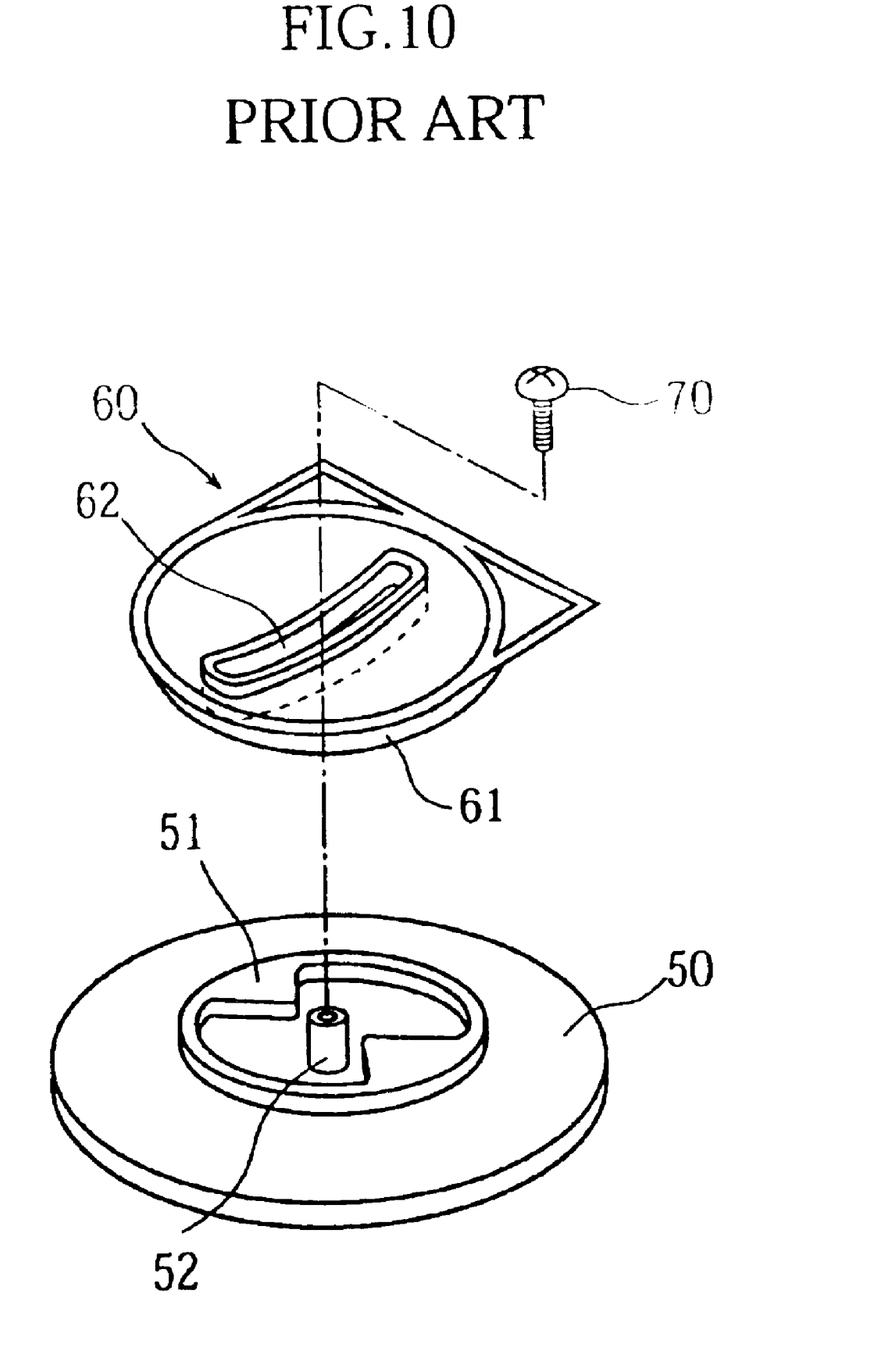
FIG. 10 is an exploded view showing an example of conventional tilt-swivel stand.

An example of conventional tilt-swivel stands is disclosed in JP-A-6(1994)-189229. The conventional stand, as shown in FIG. 10 of the accompanying drawings, is provided with a base 50 placed on e.g. a desk, and a movable member 60 upon which a CRT is mounted.

The base 50 is provided at its upper portion with a concave supporting surface 51 coinciding with a part of the surface of a sphere. An upright protrusion 52 extends at the center of the supporting surface 51. The movable member 60 is provided at its lower portion with a convex slide surface 61 whose curvature is equal to that of the above-mentioned concave surface 51. The slide surface 61 is formed with an elongated guide groove 62 to receive the protrusion 52 of the base 50. The width of the groove 62 is slightly greater than the outer diameter of the protrusion 52.

In the assembled state, the concave surface 51 is held in sliding engagement with the convex slide surface 61, with the protrusion 52 extending into the guide groove 62. A screw 70 with a sufficiently large head is driven into the upper portion of the protrusion 52 to prevent the movable member 60 from coming off the base 50.

With the above arrangement, the movable member 60 is still allowed to tilt on the base 50 as the protrusion 52 is moved along the groove 62. Also, the movable member 60 can be swiveled about the protrusion 52 with respect to the base 50, at whatever position the protrusion 30 is located within the guide groove 62.

However, in the conventional tilt-swivel stand, the screw 70 is used for holding the base 50 and the movable member 60 together. Unfavorably, driving the screw 70 into the prescribed portion requires for an additional procedure in the assembly line. Also, to use the screw 70 will raise the production costs.

Figure 11:
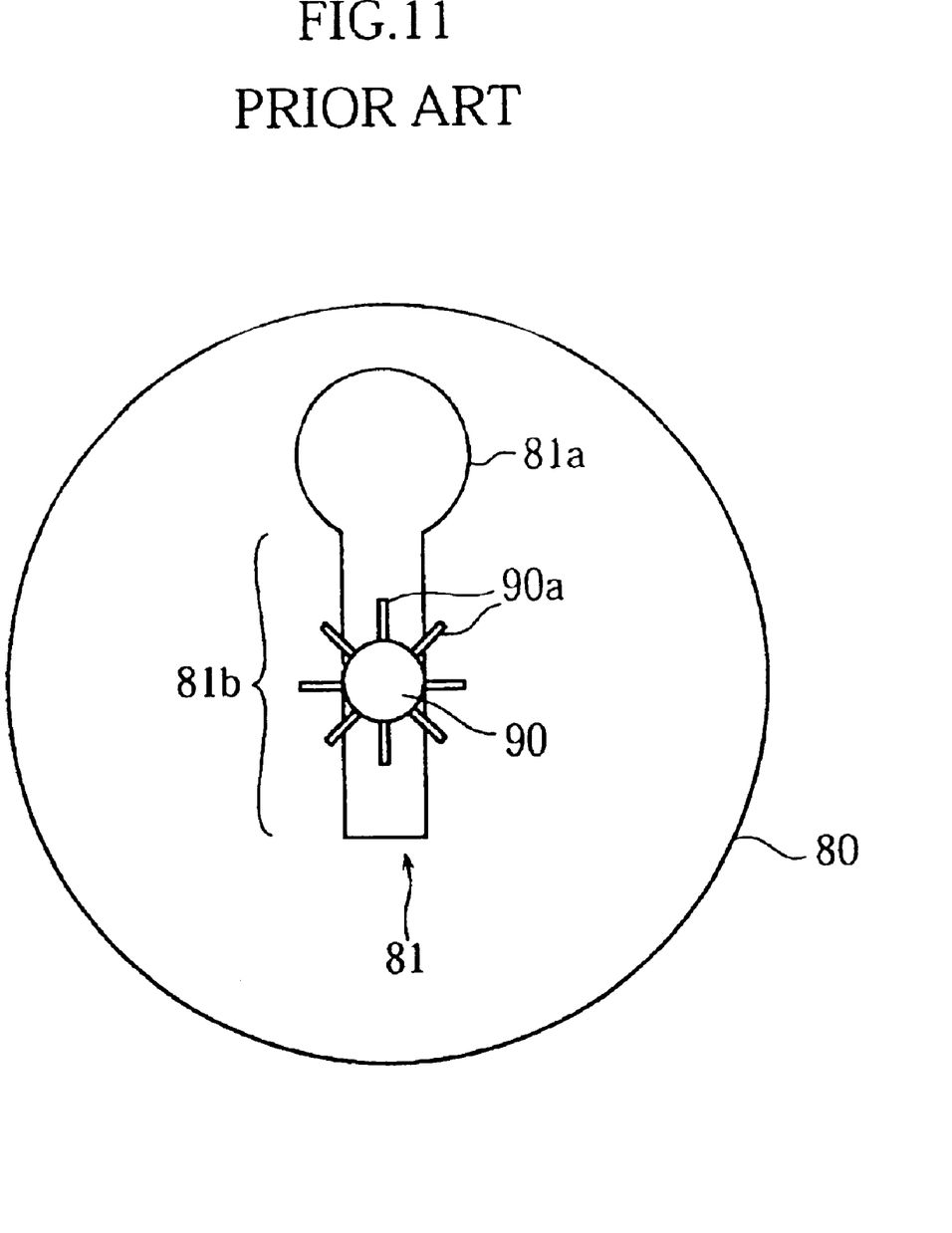
FIG. 11 is a schematic plan view showing another example of conventional tilt-swivel stand.

Another example of conventional tilt-swivel stands is disclosed in JP-A-8(1996)-140017. As shown in FIG. 11 of the accompanying drawings, the conventional stand includes a base (not shown) and a movable member 80 held in sliding engagement with the base, as in the previous conventional stand (FIG. 10). The tilt-swivel stand of FIG. 11 is different from the previous one in that no screw is used for attaching the movable member 80 to the base.

Specifically, as shown in FIG. 11, an upright protrusion 90 is arranged at the center of the base, and a guide groove 81 is formed in the movable member 80 for receiving the upright protrusion 90. The upright protrusion 90 is formed with several fins 90a projecting radially. The guide groove 81 has a uniform width except for one end 81a at which a generally circular through-hole is formed.

For attaching the movable member 80 to the non-illustrated base, the protrusion 90 is inserted into the guide groove 81 at the enlarged end 81a. The end 81a is large enough to allow the fins 90a to go beyond the groove 81. Then, the movable member 80 is caused to slide on the base, so that the fins 90a are moved from the end 81a to the constant-width portion 81b, as shown in FIG. 11. In this state, some of the horizontally projecting pins 90a are caught by the movable member 80, thereby securing the movable member 80 to the non-illustrated base.

With such an arrangement, no additional fixing means such as a screw is needed, which is advantageous to reducing the number of parts necessary for assembling the tilt-swivel stand. Consequently, the production costs and production time are both reduced.

Though the tilt-swivel stand of FIG. 11 has the above advantages, it has been found disadvantageous in the following point.

As long as the protrusion 90 is located in the constant-width portion 81b of the groove 81, the movable member 80 is prevented from coming off the non-illustrated base due to the fins 90a abutting on the movable member 80. However, the protrusion 90 may be brought to the enlarged portion 81a of the groove 81 when the user tilts the CRT mounted on the movable member 80 too much. This unusual positioning of the protrusion 90 relative to the groove 81 is invisible to the user since an CRT is placed on the movable member 80. Thus, unaware of the current situation, the user may try to move the CRT to a different location and lift it. However, with the stopping fins 90a located at the enlarged portion 81a of the groove, the non-illustrated base may come off the movable member 80 and may fall onto the desk.

SUMMARY OF THE INVENTION

The present invention has been proposed under the circumstances described above, and its object is to provide a tilt-swivel stand which can be readily assembled and does not suffer from accidental detachment of the movable member from the base.

According to the present invention, there is provided a tilt-swivel stand including: a base member provided with a concave surface having a predetermined curvature; a movable member mounted on the base member and provided with a convex surface having a curvature equal to the curvature of the concave surface; and connecting means for connecting the base member to the movable member. The connecting means includes a protrusion and a guide groove which has a predetermined width. The protrusion includes a shank and an engaging portion which has a normal size greater than the width of the guide groove. The engaging portion is flexible enough to go through the guide groove.

With such an arrangement, the movable member is readily attached to the base member simply by pressing the protrusion into the guide groove. The flexible engaging portion is reduced in overall size as it is going through the guide groove, and then restores on its own to the original shape after passing by the guide groove. In this position, the engaging portion is caught by the member in which the guide groove is formed (that is, the movable member or base member), thereby holding together the movable member and the base member.

In the assembled state, the movable member is mounted on the base member, with the convex surface of the former held in sliding engagement with the concave surface of the latter. The guide groove into which the protrusion is inserted for restriction of movement is typically straight, thereby allowing the movable member to move in a vertical plane (that is, "tilt") relative to the base member. How far the movable member can be tilted depends upon the length of the guide groove.

Though the tilting movement is restricted by the configuration of the guide groove, as stated above, basically the rotation of the protrusion relative to the guide groove is not limited by the geometry of the groove. This means that rotation of the protrusion relative to the guide groove can take place at any position in the groove.

According to a preferred embodiment of the present invention, the shank of the protrusion includes a diametrically larger portion and a diametrically smaller portion. The diametrically larger portion is substantially equal in size to the width of the guide groove.

With such an arrangement, the protrusion is properly guided by the guide groove when the diametrically larger portion of the protrusion is held in the guide groove.

According to a preferred embodiment of the present invention, the protrusion is provided on the movable member, while the guide groove is provided on the base member.

Alternatively, the protrusion may be provided on the base member, while the guide groove may be provided on the movable member.

Preferably, the protrusion may have an anchor-like configuration. Specifically, the engaging portion may include a pair of engaging pieces which are non-parallel to each other. Each of the engaging pieces may be a generally rectangular plate, though the present invention is not limited to this.

The tilt-swivel stand of the present invention may further includes stopping means for restricting rotation of the movable member relative to the base member. Preferably, the stopping means may include a profiled element and a stopping wall. The profiled element may be arranged adjacent to the protrusion, while the stopping wall may be arranged adjacent to the guide groove.

Preferably, the profiled element may be provided with a generally rectangular portion and a semi-cylindrical portion.

Other features and advantages of the present invention will become apparent from the detailed description given below with reference to the accompanying drawings.

DETAILED DESCRIPTION OF THE PREFERRED EMBODIMENTS

The preferred embodiments of the present invention will be described below with reference to the accompanying drawings.

Reference is first made to FIGS. 1–7 illustrating a tilt-swivel stand according to a first embodiment of the present invention. Basically, the stand (generally indicated by reference numeral 1) includes a base 10 to be placed on e.g. a desk, and a movable member 20 mounted on the base 10. Each of the base 10 and the movable member 20 is a one-piece component which may be made of a resin material.

Figure 1:
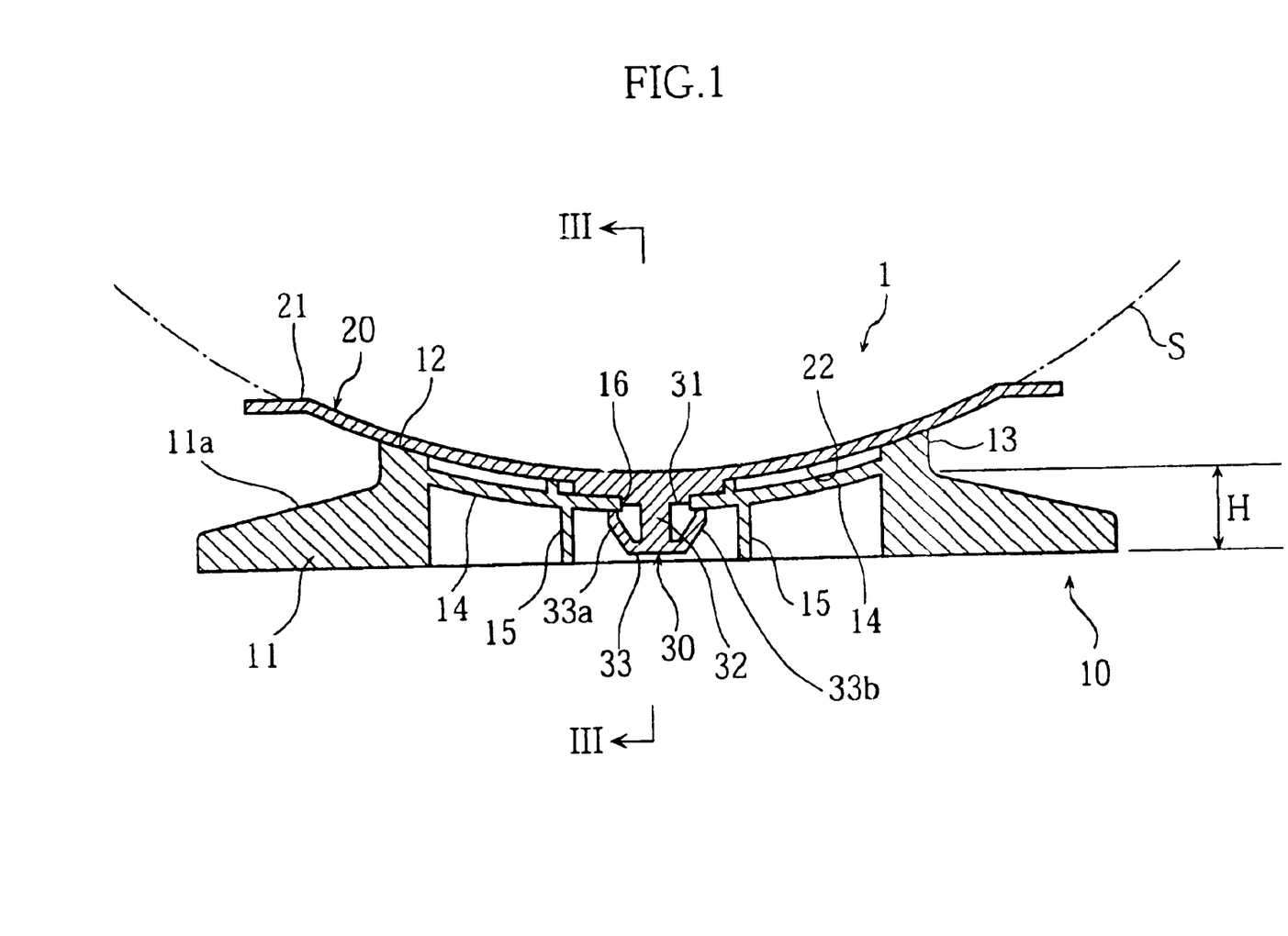
FIG. 1 is a sectional side view showing a tilt-swivel stand according to a first embodiment of the present invention.
Figure 2:
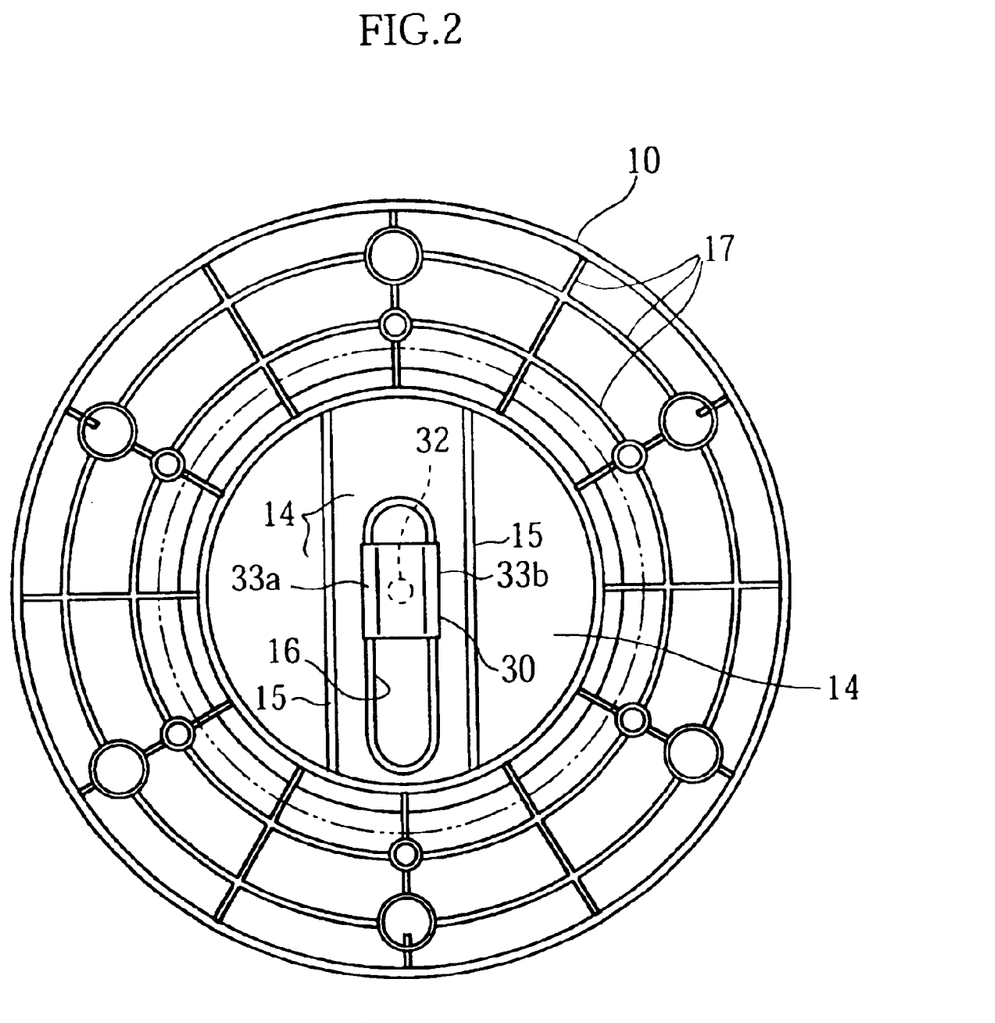
FIG. 2 is a bottom view showing the tilt-swivel stand of FIG. 1.
Figure 3:
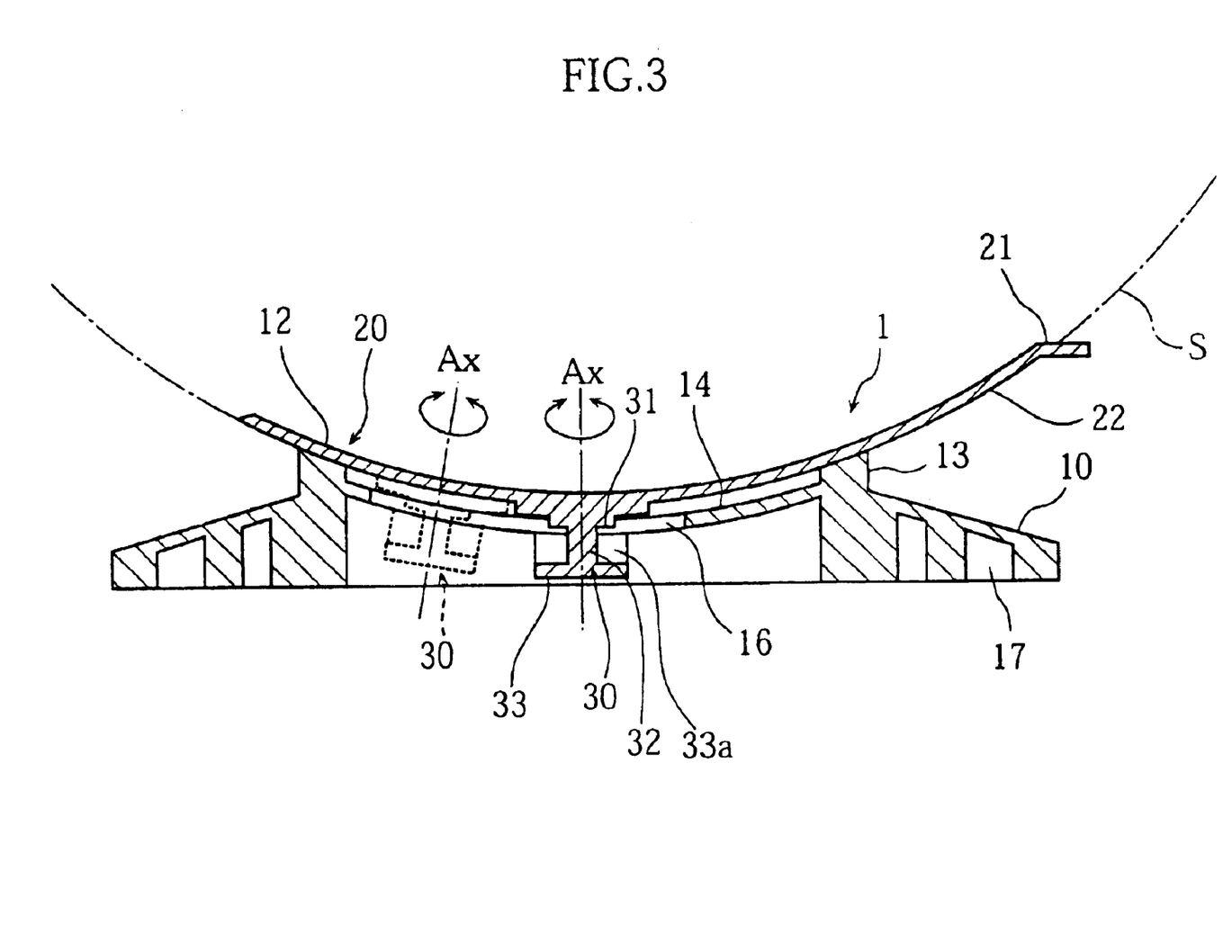
FIG. 3 is a sectional view taken along lines III—III in FIG. 1.

As seen from FIGS. 1–3, the base 10 is provided with a leg portion 11, which is circular as viewed from above (or below). As shown in FIG. 1, the leg portion 11 has a predetermined height H. The upper surface 11a of the leg portion descends toward the periphery of the leg portion. The leg portion 11 is not a completely solid body but rather hollow for reduction in weight. For improving the mechanical strength, the leg portion 11 is provided with a plurality of reinforcing ribs 17, as shown in FIG. 2.

The base 10 is provided at its upper portion with a slide surface 12 having a circular profile, as viewed from above. The slide surface 12 is (a part of) a concave surface, which is configured to snugly hold a sphere S (see FIG. 1 or 3). As viewed from above, the center of the slide surface 12 coincides with the center of the leg portion 11. The slide surface 12 is the top surface of a cylindrical wall portion 13 extending upright from the leg portion 11. The height of the wall portion 13 may be smaller than the height H of the leg portion 11.

A partition wall 14 is provided slightly below the slide surface 12 to be connected to the inner surface of the wall portion 13. As seen from FIG. 1 or 3, the partition wall 14 is so configured as to snugly engage the surface of a sphere (not shown) which is concentric with but slightly larger than the above-mentioned sphere S.

Figure 4:
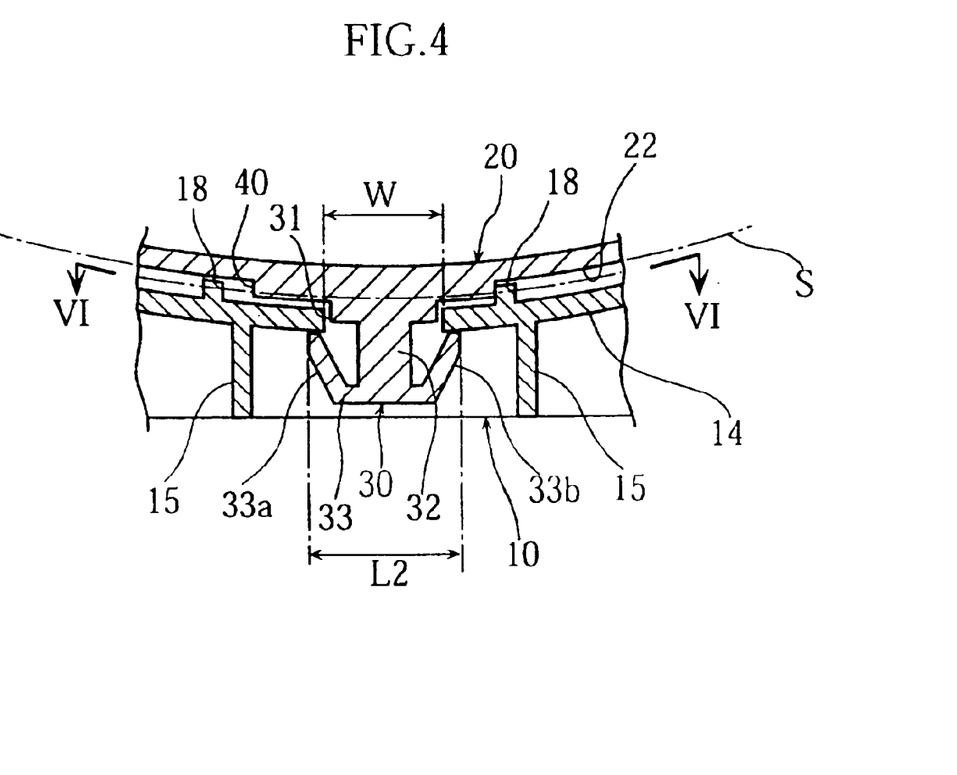
FIG. 4 is an enlarged sectional side view showing principal portions of the tilt-swivel stand shown in FIG. 1.
Figure 5:
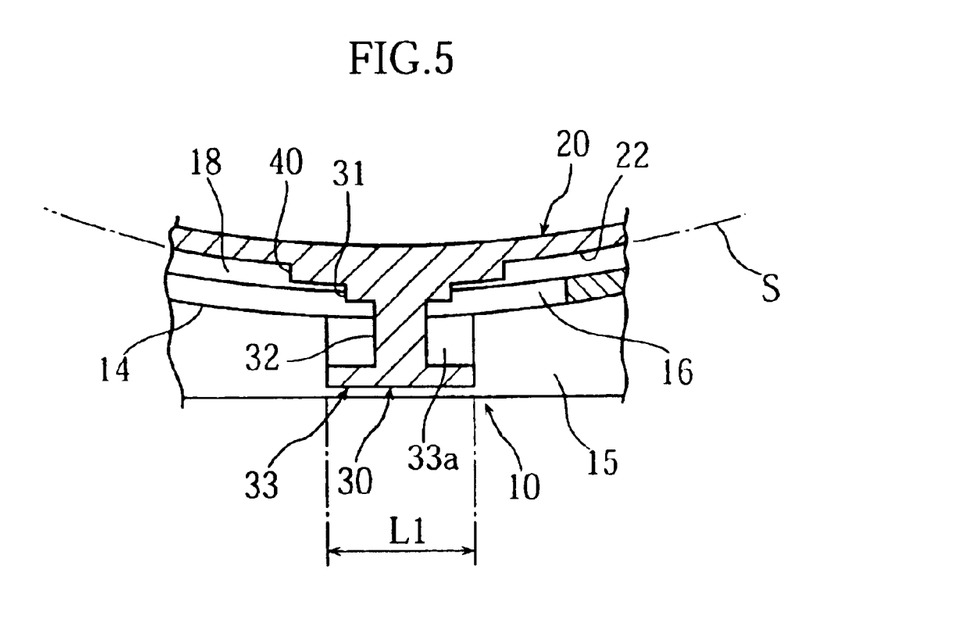
FIG. 5 is an enlarged sectional side view showing principal portions of the tilt-swivel stand shown in FIG. 3.
Figure 6A:
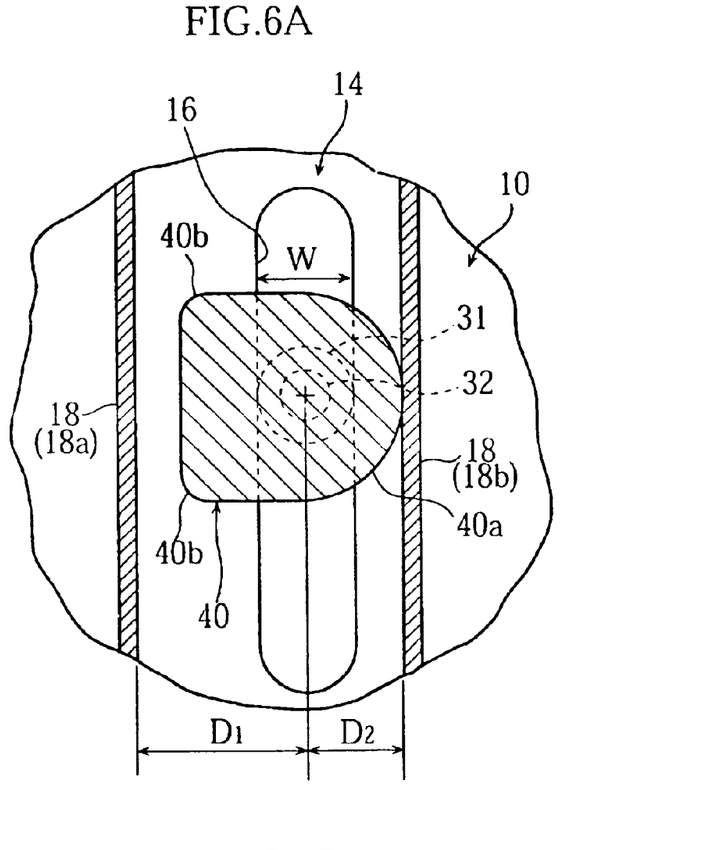
FIG. 6A is a view taken along lines VI—VI in FIG. 4.

As shown in FIGS. 1–6A, the partition wall 14 is formed with an elongated guide groove 16 having a predetermined width W (FIGS. 4 and 6A). Below the partition wall 14 is provided a pair of ribs 15 for reinforcing the wall 14. The ribs 15 extend in parallel to the guide groove 16 which is located between these ribs. As best shown in FIGS. 4 and 6A, a pair of ribs 18 are provided on the upper surface of the partition wall 14. These ribs 18 also extend in parallel to the guide groove 16, with the groove located between them. The height of the ribs 18 is short enough to avoid contact with the sphere S.

Referring to FIG. 1, the movable member 20 is provided with an upper surface 21 to be connected to a CRT. The lower surface 22 of the movable member is a convex surface coinciding with a part of the surface of the sphere S. Thus, the lower surface 22 is snugly supported by the slide surface 12 of the base 10, as illustrated in the figure. The movable member 20 is large enough to keep the lower surface 22 in proper engagement with the slide surface 12 after the movable member 20 has been tilted relative to the base 10 within a predetermined range.

The movable member 20 is formed integrally with a downward protrusion 30 located at the center of the lower surface 22. As best shown in FIGS. 4 and 5, the protrusion 30 is divided into three portions: a base portion 31, an intermediate portion 32 and an end portion 33. The base portion and the intermediate portion are referred to as a shank portion of the protrusion. The base portion 31 and the intermediate portion 32 both have a circular cross section, but the former is greater in diameter than the latter. The diameter of the base portion 31 is slightly smaller than the width W of the guide groove 16. Thus, the base portion 31 is movable along the guide groove 16, while also rotatable within the groove.

The intermediate portion 32, which is axially longer than the base portion 31, connects the base portion 31 to the end portion 33.

The end portion 33 is formed with first and second anchoring arms 33a, 33b. As seen from FIGS. 4 and 5, each of the arms 33a, 33b is a generally rectangular plate, which is appropriately flexible, as will be described later. The length of each arm is L1, as shown in FIG. 5. In FIG. 4, the first arm 33a extends upward and to the left, while the second arm 33b extends upward and to the right. The maximum width of the end portion 33 is L2. According to the present invention, the length L1 and the width L2 are both greater than the width W of the guide groove 16. With such an arrangement, the first and second arms 33a, 33b come into abutment with the partition wall 14, whatever angles the protrusion 30 is rotated (swiveled) through in the guide groove 16. Thus, the movable member 20 is advantageously prevented from accidentally coming off the base 10.

As shown in FIGS. 4–6A, the lower surface 22 of the movable member 20 is integrally formed with a profiled solid element or stopper 40 adjacent to the base portion 31 of the protrusion 30. In cooperation with a stopping wall or rib 18, the profiled solid element or stopper 40 serves to restrict the rotation of the movable member 20 relative to the base 10, as described below.

Figure 6B:
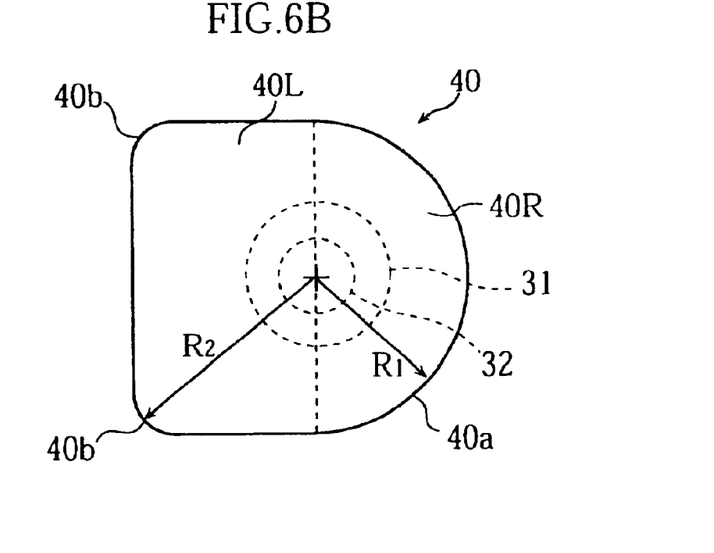
FIG. 6B is a plan view showing the stopper in FIG. 6A.

Referring to FIGS. 6A and 6B, the stopper 40 is divided into a generally rectangular portion 40L and a semi-cylindrical portion 40R. The rectangular portion 40L is formed with two round corners 40b, while the semi-cylindrical portion 40R is formed with a semi-cylindrical surface 40a. The center of the semi-cylindrical portion 40R coincides with the center of the base portion 31 and intermediate portion 32. As shown in FIG. 6B, the radius of the semi-cylindrical portion 40R is set at R1, while the distance between the center of the intermediate portion 32 and the round corner 40b is set at R2. The length R1 is smaller than the length R2 (R1 <R2).

In cooperation with the ribs 18 formed on the partition wall 14, the stopper 40 prevents the movable member 20 from swiveling about the protrusion 30 through more than the maximum angle. Specifically, as shown in FIG. 6A, the rib 18a on the left is spaced from the center of the base portion 31 by a distance D1, while the other rib 18b on the right is spaced from the center of the base portion 31 by a distance D2. The distance D1 is greater than the distance D2 (D1>D2). The length or radius R1 of the semi-cylindrical portion 40R is equal to or slightly smaller than the distance D2 (D1>D2≧R1). The length R2 of the rectangular portion 40L is rendered greater than the distance D1 (R2>D1>D2≧R1).

With such an arrangement, when the movable member 20 is caused to swivel relative to the base 10, the semi-cylindrical portion 40R of the stopper 40 does not come into abutment with any of the right and the left ribs 18a, 18b. On the other hand, the round corners 40b of the rectangular portion 40L of the stopper 40 will come into abutment with the right rib 18b (but not with the left rib 18a) in swiveling the movable member 20 relative to the base 10. In this manner, the stopper 40 prevents the movable member 20 from being rotated about the protrusion 30 endlessly. In the illustrated embodiment, the stopper 40 (and hence the movable member 20) can be rotated through a maximum of 180 degrees.

As being moved along the guide groove 16, the axis of the protrusion 30 of the movable member 20 varies in inclination. For instance, when the protrusion 30 of the movable member 20 takes the lowermost position shown in FIG. 3, the rotation axis Ax extends upright, so that the non-illustrate CRT mounted on the movable member 20 is caused to swivel in the horizontal plane. However, when the movable member 20 is shifted to the left relative to the base 10 and takes a different position indicated by broken lines, the rotation axis Ax is not upright but slightly inclined. In this position, the non-illustrate CRT is caused to swivel in a non-horizontal plane.

Figure 7:
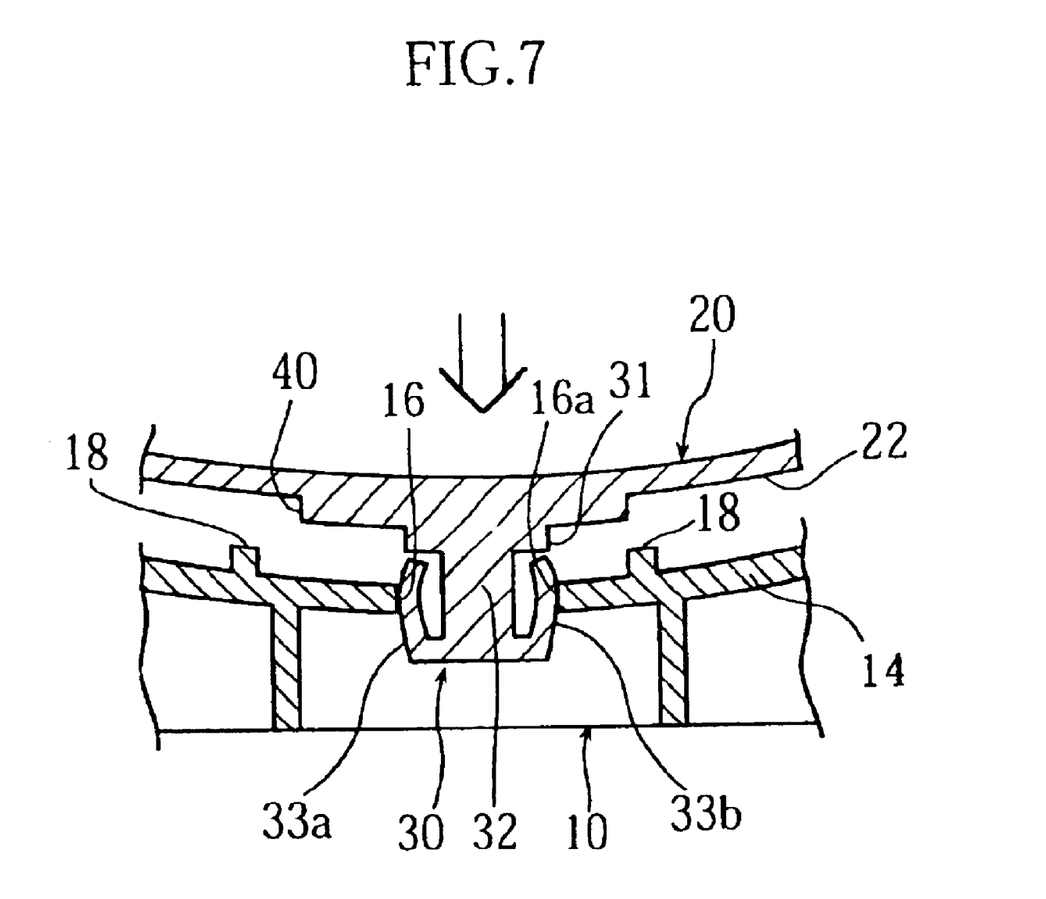
FIG. 7 illustrates how the tilt-swivel stand works.

Referring to FIG. 7, according to the above-illustrated embodiment, the movable member 20 is readily assembled into the base 10 simply by pressing the protrusion 30 of the movable member 20 into the guide groove 16 of the base 10. At this time, the flexible arms 33a, 33b will give no unduly large resisting force to the partition wall 14. Once the protrusion 30 is properly inserted into the guide groove 16, with the arms 33a, 33b having gone through the groove 16, the once-closed arms 33a, 33b are restored to the normal state, as shown in FIG. 4. As a result, the movable member 20 is anchored to the base 10, while it still can tilt or rotate relative to the base 10.

Figure 8:
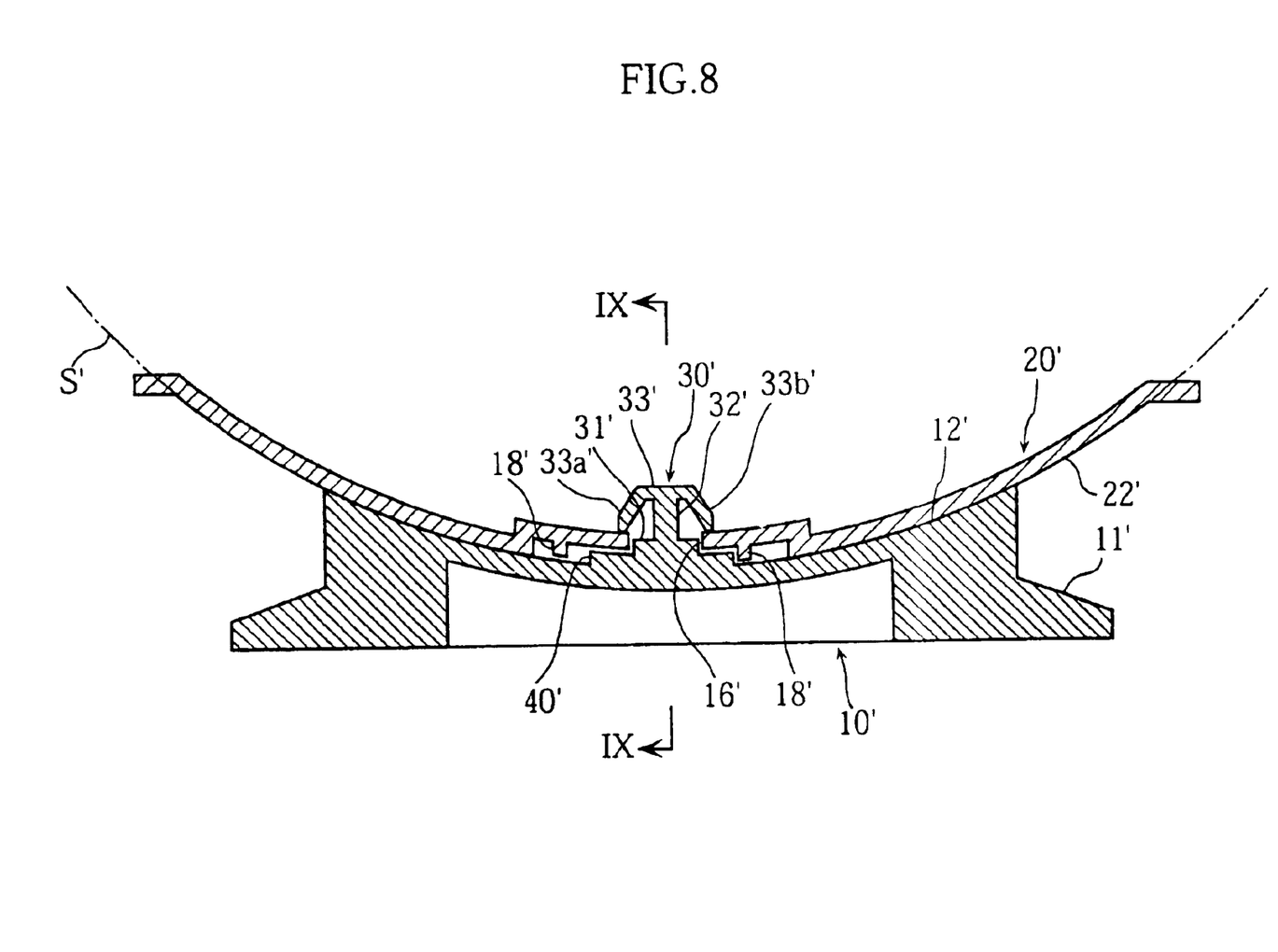
FIG. 8 is a sectional side view showing a tilt-swivel stand according to a second embodiment of the present invention.
Figure 9:
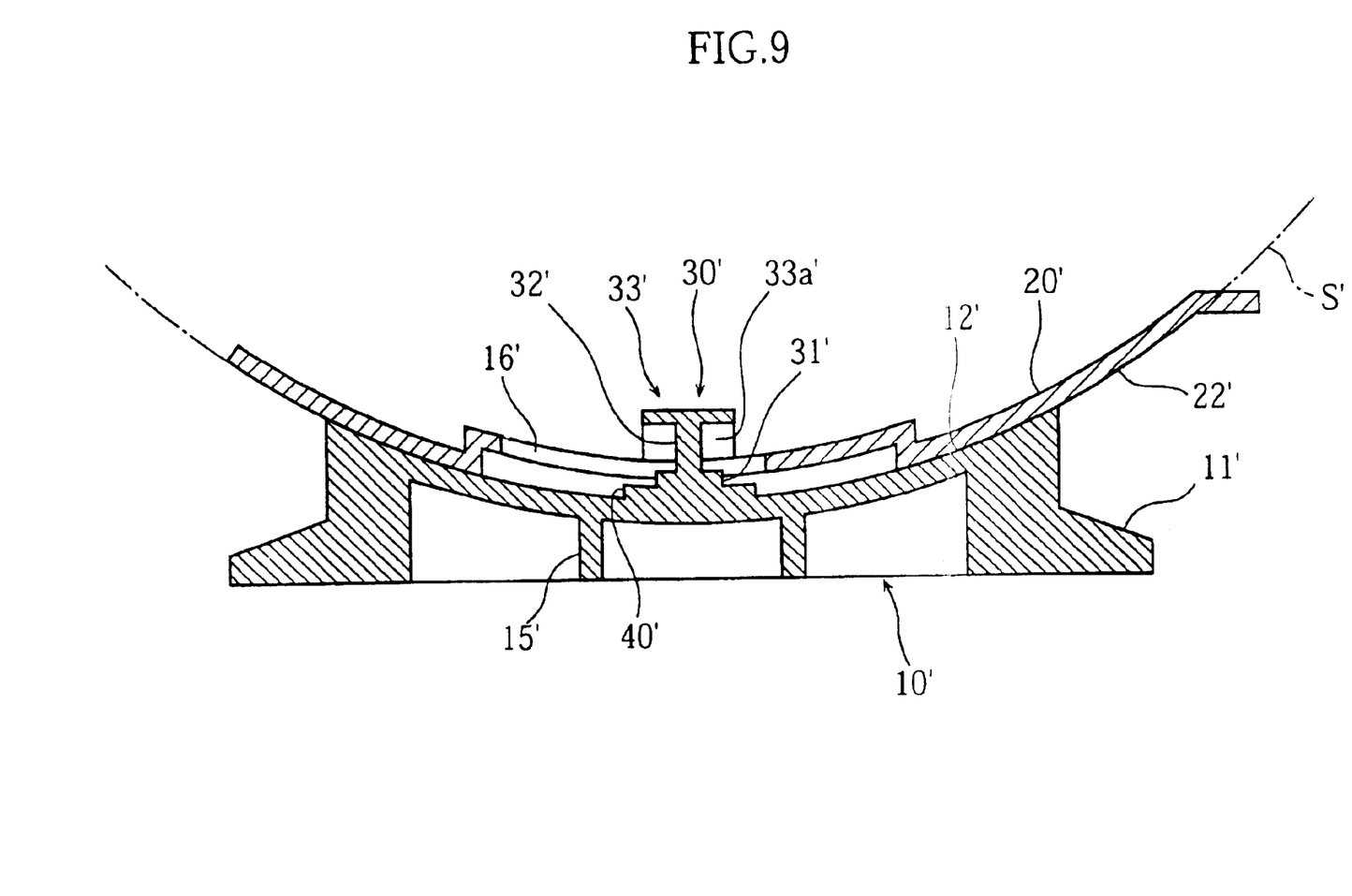
FIG. 9 is a sectional view taken along lines IX—IX in FIG. 8.

Reference is now made to FIGS. 8 and 9 illustrating a tilt-swivel stand according to a second embodiment of the present invention. As in the first embodiment described above, the tilt-swivel stand of the second embodiment includes a base 10' and a movable member 20' slidably mounted on the base 10'. The base 10' is provided with a leg portion 11' and reinforcing ribs 15'. The convex lower surface 22' of the movable member 20' and the concave upper surface 12' of the base 10' are both configured to partially coincide with the surface of a sphere S'. Thus, the lower surface 22' comes into snug engagement with the upper surface 12'.

Differing from the first embodiment, a protrusion 30' is provided on the side of the base 10', while a guide groove 16' cooperating with the protrusion 30' is provided on the side of the movable member 20'.

However, the arrangements of the protrusion 30' itself are identical to those of the first embodiment. For instance, the protrusion 30' is divided into a diametrically larger base portion 31', a diametrically smaller intermediate portion 32' and an end portion 33' which is provided with a pair of flexible anchoring arms 33a' and 33b'.

Further, the relation between the protrusion 30' and the guide groove 16' is also the same as that of the first embodiment. For instance, the width of the guide groove 16' is substantially equal to or slightly greater than the diameter of the base portion 31' of the protrusion 30'. The flexible arms 33a' and 33b' are readily pressed into the groove 16'. Once properly put in place, the anchoring arms 33a' and 33b' serve to prevent the movable member 20' from accidentally coming off the base 10', while also allowing the movable member 20' to tilt and swivel relative to the base 10'.

The base 10' is formed with a stopper 40' adjacent to the base portion 31' of the protrusion 30', while the movable member 20' is formed with parallel ribs 18' cooperating with the stopper 40' of the base 10'. As in the first embodiment, the stopper 40' is brought into abutment with (either one of) the ribs 18 to prevent the movable member 20' from being rotated too much relative to the base 10'.

According to the second embodiment, the protrusion 30' is provided on the stationary base 10'. This means that, differing from the first embodiment (see FIG. 3), the rotation axis of the movable member 20' does not vary in inclination as the movable member 20' is being tilted relative to the base

10'. Thus, the swiveling of the movable member 20' takes place in the same plane.

The present invention is not limited to the two embodiments described above. For instance, the tilt-swivel stand of the present invention can be used for supporting an object other than a CRT. Further, the configuration of the anchoring arms for attaching the movable member to the base is not limited to the illustrated example. The anchoring arms can be made into many forms as long as they facilitate the attachment of the movable member to the base and prevent the movable member from accidentally coming off the base.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A tilt-swivel stand comprising:
   a base member provided with a concave surface having a predetermined curvature;
   a movable member mounted on the base member and provided with a convex surface having a curvature equal to the curvature of the concave surface; and
   a connector for connecting the base member to the movable member in a tilting and swiveling relationship, the connector including a protrusion formed as a single part with the base member and extending from the base member; and
   an elongated guide groove which has a predetermined width and is disposed in the movable member, the protrusion including a shank and an engaging portion which has a normal size greater than the width of the elongated guide groove;
   wherein the engaging portion is flexible enough to go deflect upon insertion through the elongated guide groove;
   wherein the shank is disposed through the elongated guide groove when the stand is assembled; and
   wherein the engaging portion directly engages the movable member from above regardless of relative tilting and swiveling position between the base member and the movable member when the stand is assembled.

2. The tilt-swivel stand according to claim 1, wherein the shank of the protrusion includes a diametrically larger portion and a diametrically smaller portion, the diametrically larger portion being substantially equal in size to the width of the guide groove.

3. The tilt-swivel stand according to claim 1, wherein the protrusion has an anchor-like configuration.

4. The tilt-swivel stand according to claim 3, wherein the engaging portion comprises a pair of engaging pieces which are non-parallel to each other.

5. The tilt-swivel stand according to claim 4, wherein each of the engaging pieces comprises a generally rectangular plate.

6. The tilt-swivel stand according to claim 1, further comprising stopping means for restricting rotation of the movable member relative to the base member.

7. The tilt-swivel stand according to claim 6, wherein the stopping means includes a profiled element and a stopping wall, the profiled element being arranged adjacent to the protrusion, the stopping wall being arranged adjacent to the guide groove.

8. The tilt-swivel stand according to claim 7, wherein the profiled element is provided with a generally rectangular portion and a semi-cylindrical portion.

* * * * *